US007832240B2

(12) United States Patent
Najima

(10) Patent No.: US 7,832,240 B2
(45) Date of Patent: Nov. 16, 2010

(54) LID LOCK DEVICE

(75) Inventor: Masahiro Najima, Kanagawa (JP)

(73) Assignee: Piolax Inc., Yokohama-shi, Kanagawa (JP)

( * ) Notice: Subject to any disclaimer, the term of this patent is extended or adjusted under 35 U.S.C. 154(b) by 908 days.

(21) Appl. No.: 11/705,498

(22) Filed: Feb. 13, 2007

(65) Prior Publication Data

US 2007/0186598 A1 Aug. 16, 2007

(30) Foreign Application Priority Data

Feb. 14, 2006 (JP) .......................... P2006-036562

(51) Int. Cl.
*B60R 25/02* (2006.01)

(52) U.S. Cl. ........................... 70/208; 70/209; 292/121

(58) Field of Classification Search ........... 70/208-210, 70/159-162; 292/121, 109, 137, 138, 146, 292/150, 169, 175, DIG. 11, DIG. 37

See application file for complete search history.

(56) References Cited

U.S. PATENT DOCUMENTS 5,630,630 A * 5/1997 Price et al. .................. 292/128
7,048,311 B2 * 5/2006 Sawatani et al. .............. 292/33
7,188,871 B2 * 3/2007 Nemoto et al. .............. 292/170
2002/0171248 A1 * 11/2002 Diss et al. .................... 292/164
2008/0042450 A1 * 2/2008 Jianping et al. ............. 292/216
2009/0179438 A1 * 7/2009 Horton et al. ............ 292/336.3

FOREIGN PATENT DOCUMENTS

JP 2001-32607 2/2001

* cited by examiner

*Primary Examiner*—Peter M Cuomo
*Assistant Examiner*—Kristina R Fulton
(74) *Attorney, Agent, or Firm*—McGinn IP Law Group, PLLC

(57) ABSTRACT

A lid lock device includes: a housing fixed to either of a lid and a box; a hook member engaged with and disengaged from a lock portion; an elastic biasing unit for biasing the hook member; a control member for controlling the movement of the hook member; and a translating unit for translating the control member, wherein: the hook member includes: a hook portion which is brought into direct engagement with and disengagement from the lock portion; and an operating portion for translating the hook portion from a closing corresponding state to an opening corresponding state; a first wall and a second wall are provided on either of the hook member and the control member; a recessed portion is formed on either of the walls; and a raised portion is formed on the other of the hook member and the control member.

14 Claims, 11 Drawing Sheets

LID LOCK DEVICE

BACKGROUND OF THE INVENTION

1. Field of the Invention

The present invention relates to a lock device for locking, for example, a lid mounted in a console box of a motor vehicle in such a manner as to be opened and closed.

2. Description of the Related Art

Although not illustrated specifically, a conventional lid lock device was developed for a lid of a glove box and is made up of a housing which is fixed to the lid's side, a latch rotatably supported on the housing so as to be brought into engagement with and disengagement from a striker, a spring for biasing the latch in a direction in which the engagement of the latch with the striker is released, a slider with a recessed portion which is slidably supported on the housing so as to control the rotation of the latch and a connecting lever which connects the slider with an operating unit (refer to, for example, JP-A-2001-32607).

In an actual usage, when the striker and the latch are in engagement with each other, since a lower end portion of the latch is in abutment with a wall surface of the slider against a biasing spring pressure of the spring, the lid of the glove box is kept closed in this state. Then, when opening the lid, the operating unit is operated to cause the slider to slide in a predetermined direction via the connecting lever, this causes the lower end portion of the latch to face the interior of the recessed portion, whereby the latch automatically rotates in the direction in which the engagement of the latch with the striker is released by virtue of the biasing spring pressure of the spring, so as to permit the opening of the lid of the glove box.

SUMMARY OF THE INVENTION

Consequently, the conventional lock device has an advantage that the lid of the glove box can be opened and closed only by controlling the rotation of the latch against the biasing spring pressure applied thereto and allowing the latch to rotate by virtue of the biasing spring pressure in the direction in which the engagement thereof with the striker is released. However, due to the reason that the means for controlling the rotational positions of the latch is necessary when attempting to rotate the latch in the direction in which the engagement thereof with the striker is released, a full-open stopper wall is provided which protrudes largely outwards towards the housing's side. However, the provision of the full-open stopper wall has tended to cause a problem that the lock device itself is increased in size and the irregular configuration on the surface of the housing is made complex in vain.

The invention was developed with a view to solving effectively the problem inherent in the conventional lock device, and according to a first aspect of the invention, there is provided A lid lock device for locking a lid which is mounted in a box and which is opened and closed, the lock device including: a housing fixed to either of the lid and the box; a hook member slidably supported on the housing so as to be brought into engagement with and disengagement from a lock portion provided on the other of the lid and the box; an elastic biasing unit for biasing the hook member in a direction in which the hook member is brought into engagement with the look portion; a control member slidably supported on the housing so as to control the movement of the hook member; and a translating unit for translating the control member between a closing corresponding position and an opening corresponding position, wherein: the hook member includes: a hook portion which is brought into direct engagement with and disengagement from the lock portion, and an operating portion for translating the hook portion from a closing corresponding state to an opening corresponding state; a first wall and a second wall are provided on either of the hook member and the control member to define an inner space therebetween; a recessed portion is formed on either of the first wall and a second wall; and a raised portion, entering between the first wall and the second wall and confronting both the walls, is formed on the other of the hook member and the control member; when the control member is translated to the closing corresponding position by the translating unit, the raised portion is brought into abutment with other portions of a wall surface than the recessed portion so as to prevent the operation of the operating portion; and when the control member is translated to the opening corresponding position by the translating unit, the raised portion is made to enter the recessed portion so as to enable the operation of the operating portion against a biasing force of the elastic biasing unit.

According to a second aspect of the invention, there is provided a lid lock device according to the first aspect of the invention, wherein one end portion of the control member is supported by the traveling unit, and the other end portion thereof is supported by the housing.

According to a third aspect of the invention, there is provided a lid lock device according to the first or second aspect of the invention, further including an elastic arm provided between the control member and the housing, the elastic arm pushing the control member in a same direction as a biasing direction of the hook member by the elastic biasing unit.

Consequently, in the first aspect of the invention, since the configuration is adopted for the means for controlling the farthest indexed position of the hook portion of the hook member by virtue of biasing by the elastic biasing unit in which the raised portion which is provided between the hook member and the control member is brought into abutment with the wall, there occurs no case where the indexing control portion protrudes outwards largely from the housing's side as occurring in the conventional example. Therefor, there is caused no fear that the lock device itself is increased in size, and the surface configuration of the housing does not have to be complicated in vain.

In the second aspect of the invention, due to the reason that the control member is supported by the traveling unit at one end portion and by the housing at the other end portion thereof, since the other portions than the other end portion thereof can be released from the housing, the assembly of the control member to the housing can be facilitated.

In the third aspect of the intention, due to the reason that the control member is pushed by the elastic arm in the same direction as the biasing direction of the hook member by the elastic biasing unit, since the control member is kept biased in the same direction as the biasing direction of the hook member whether the hook member is being operated or the hook member is not being operated, a fear can be prevented effectively that the control member gets loosened in case the biasing direction is opposite.

BRIEF DESCRIPTION OF THE DRAWINGS

These and other objects and advantages of this invention will become more fully apparent from the following detailed description taken with the accompanying drawings in which.

DETAILED DESCRIPTION OF THE EMBODIMENTS

The invention is such as to enable the reduction in size of a lock device itself by providing a lid lock device for locking a lid which is mounted in a box in such a manner as to opened and closed, the lock device including a housing fixed to either of the lid and the box, a hook member slidably supported on the housing so as to be brought into engagement with and disengagement from a lock portion provided on the other of the lid and the box, an elastic biasing unit for biasing the hook member in a direction in which the hook member is brought into engagement with the lock portion, a control member slidably supported on the housing so as to control the movement of the hook member, and a translating unit for translating the control member between a closing corresponding position and an opening corresponding position, wherein the hook member is made up of a hook portion which is brought into direct engagement with and disengagement from the lock portion and an operating portion for translating the hook portion from a closing corresponding state to an opening corresponding state, a first wall and a second wall are provided on either of the hook member and the control member in such a manner as to define an inner space therebetween, a recessed portion is formed on either of the walls, and a raised portion is formed on the other of the hook member and the control member in such a manner as to enter between the first wall and the second wall so as to confront both the walls, whereby when the control member is translated to the closing corresponding position by the translating unit, the raised portion is brought into abutment with other portions of a wall surface than the recessed portion so as to prevent the operation of the operating portion, whereas when the control member is translated to the opening corresponding position by the translating unit, the raised portion is made to enter the recessed portion so as to enable the operation of the operating portion against a biasing force of the elastic biasing unit.

Figure 1:
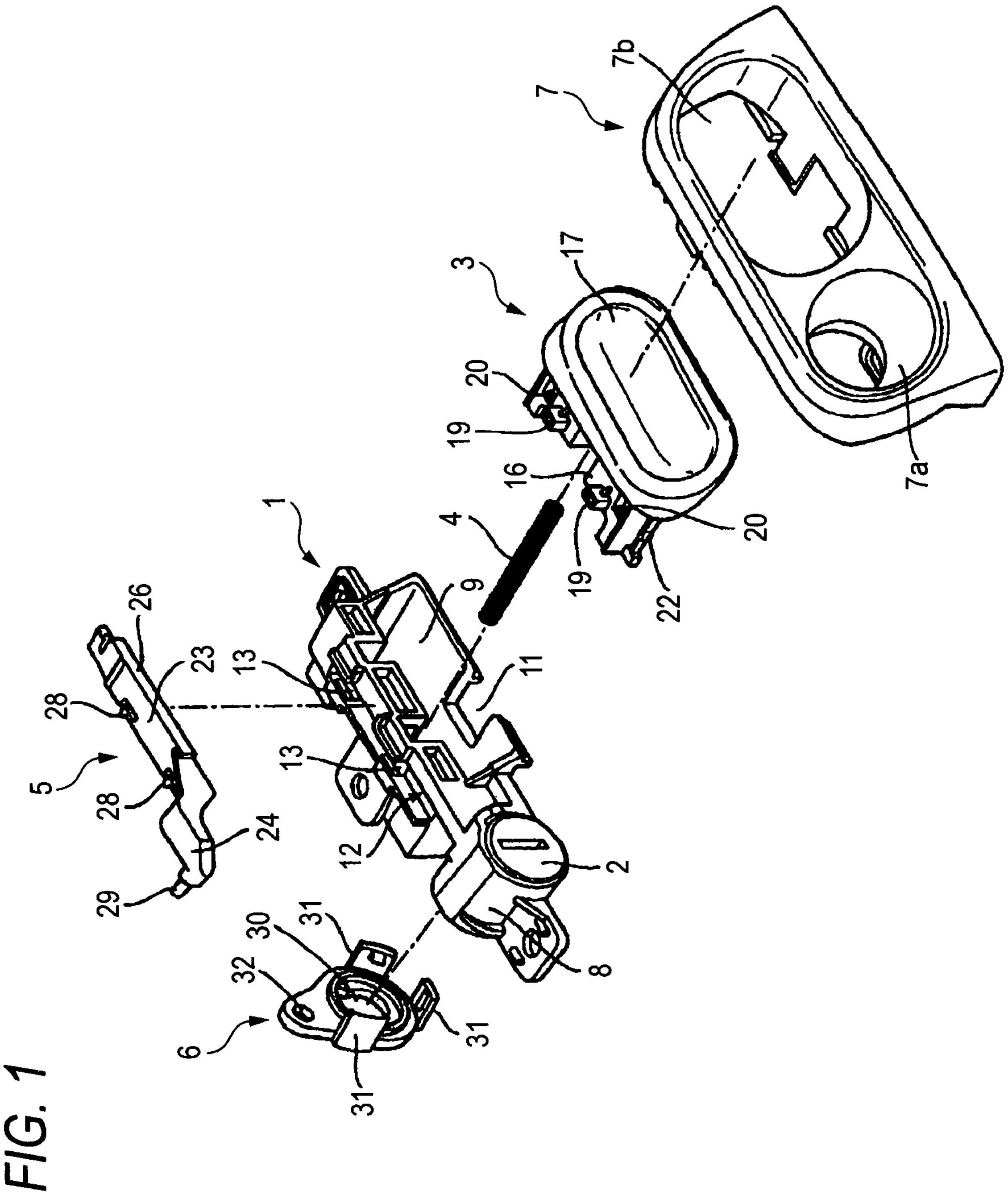
FIG. 1 is an exploded perspective view showing a lock device according to an embodiment of the intention in an exploded fashion.
Figure 2:
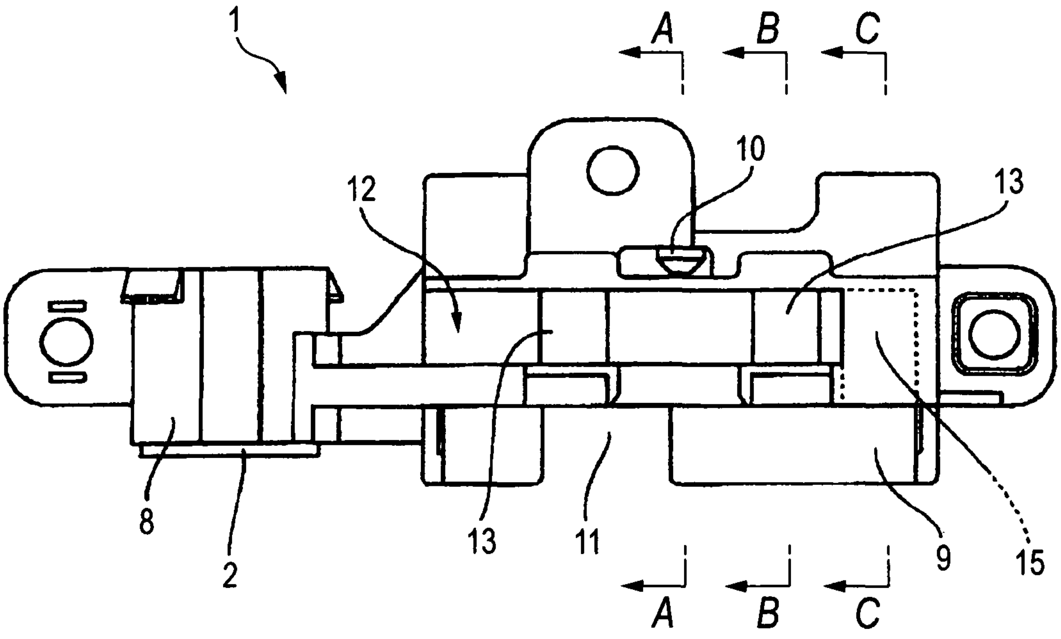
FIG. 2 is a plan view showing a housing.
Figure 3A:
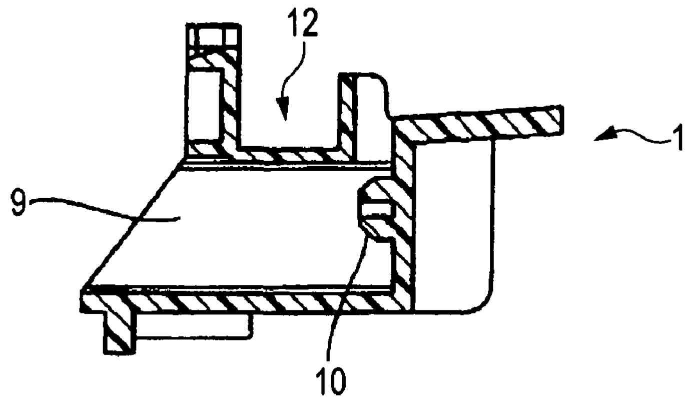
FIG. 3A is a sectional view taken along the line A-A in FIG. 2.
Figure 3B:
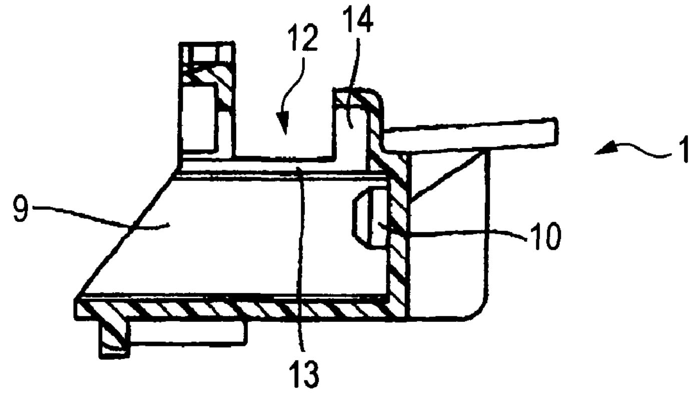
FIG. 3B is a sectional view taken along the line B-D in FIG. 2.
Figure 3C:
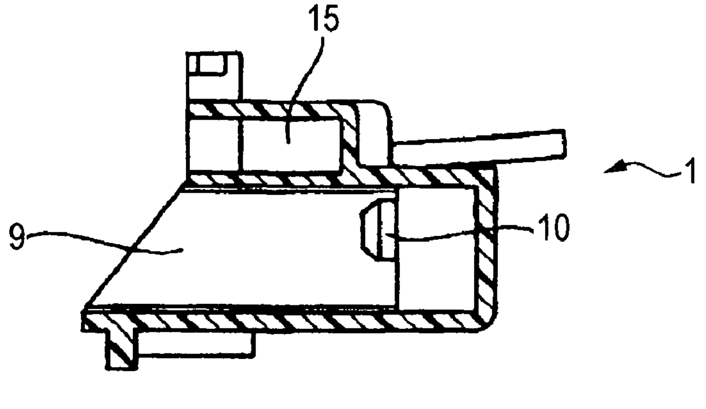
FIG. 3C is a sectional view taken along the line C-C in FIG. 2.

Hereinafter, the invention will be described in detail based on an illustrated preferred embodiment. A lock device according to the embodiment is such as to have been developed for a lid which covers and uncovers a console box of a motor vehicle and is configured to include, as shown in FIG. 1, a housing 1 which holds a key cylinder 2 as a translating unit and which is fixed to a lid's side, a hook member 3 which is supported slidably on the housing 1 so as to be brought into engagement with and disengagement from a lock hole as a lock portion which is opened in the console box's side, a compression coil spring 9 as an elastic biasing unit for biasing the hook member 3 in a direction in which the hook member 3 is brought into engagement with the lock hole, a control lever 5 which is supported slidably on the housing 1 so as to control the movement of the hook member 3, a cap 6 which is supported rotatably on a rear surface side of the key cylinder 2 and a decorative frame 7 having openings 7*a*, 7*b* which correspond individually to the key cylinder 2 and a push button portion 17 of the hook member 3, which will be described later on.

As is also shown in FIGS. 2 and 3A to 3C, a cylindrical holding cylinder 8 for holding the key cylinder 2 is formed on an end portion side of the housing 1, and a rectangular support box 9 for supporting slidably a base element 16 of the hook member 3, which will be described later on, is formed on the other end portion side thereof. In particular, the support box 9 is constructed as follows. Namely, only a front side is opened, and a projection 10 which supports one end portion of the compression coil spring 4 is formed on a rear wall, a notched opening 11 being formed in a bottom wall in such a manner as to permit a hook portion 18 of the hook member 3, which will be described later on, to appear therefrom and disappear thereinto. On the other hand, a recessed accommodation groove 12 is formed on an upper wall in such a manner as to accommodate therein the control lever 5 while allowing the control lever 5 to slide along an axial direction thereof, and a pair of open areas 13 are formed in a bottom surface of the accommodation groove 12 in such a manner as to permit the passage of raised portions 19 of the hook member 3, which will be described later on, a receiving compartment 14 for receiving therein the raised portion 19 being formed at a terminal end of each open area 13. In addition, a collapsed U-shaped support compartment 15 for supporting movably the other end portion of the control lever 5 is formed.

Figure 4A:
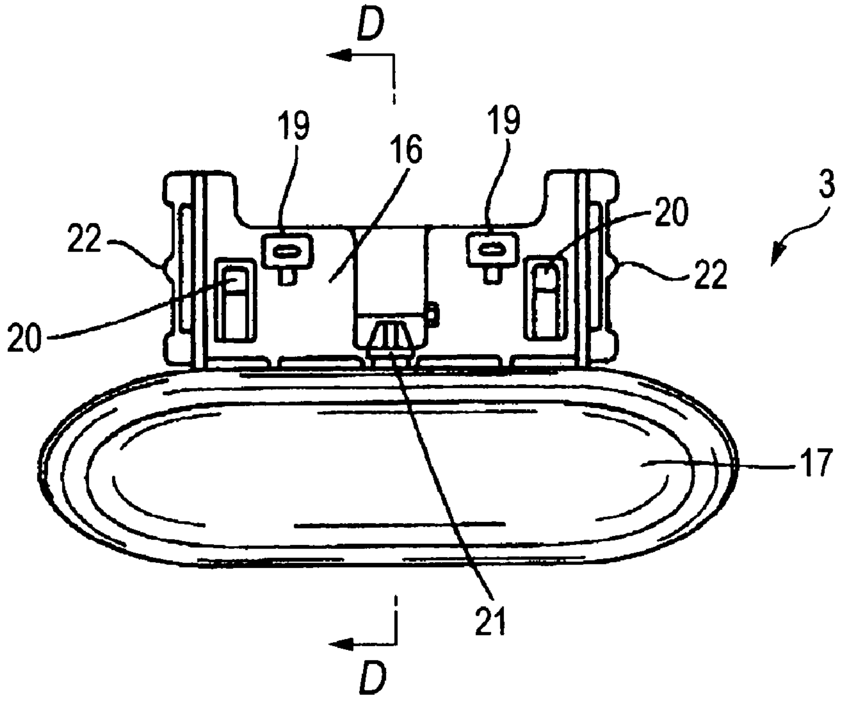
FIG. 4A is a plan view showing a hook member.
Figure 4B:
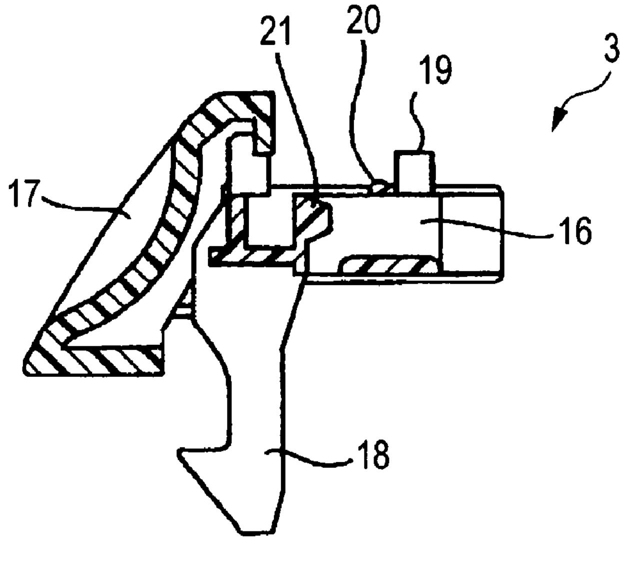
FIG. 4B is a sectional view taken along the line D-D in FIG. 4A.

As is also shown in FIGS. 4A and 4E, the hook member 3 is made up of the rectangular base element 16 which is accommodated and supported within the support box 9 of the housing 1, the push button portion 17 as an operating portion which is provided continuously to a front portion of the base element 16 and the J-shaped hook portion 18 which is suspended from a lower surface of the base element 16 so as to be brought into direct engagement with and disengagement from a lock hole opened in an opening edge of the console box. In particular, the base element 16 is constructed as follows. Namely, the pair of raised portions 19 are formed at a rear portion on an upper surface thereof which are adapted to pass through the open areas 13, respectively, which are formed in the bottom surface of the accommodation groove 12 of the housing 1, and a pair of elastic claws 20 are formed on sides of the pair of raised portions 19 for assisting the base plate 16 to slide relative to the support box 9, a projection 21 which supports the other end portion of the compression coil spring 4 being formed between the pair of raised portions 19. On the other hand, elastic blades 22 are formed on both side surfaces of the base element 16, respectively, so as to assist the base plate 16 to slide relative to the support box 9.

Consequently, in a relation between the housing 1 and the hook member 3, when the base element 16 of the hook member 3 is accommodated within the support box 9 of the housing 1 while mounting the compression coil spring 4 between the projection 10 on the housing 1 side and the projection 21 on the hook member 3 side, although the hook member 3 is elastically biased in a direction in which the hook portion 18 thereof is brought into engagement with the lock hole in the console box, a second wall 26 of the control lever 5, which will be described later on, functions as a control unit for controlling an indexed position of the hook portion 18 when the engagement occurs.

Figure 5A:
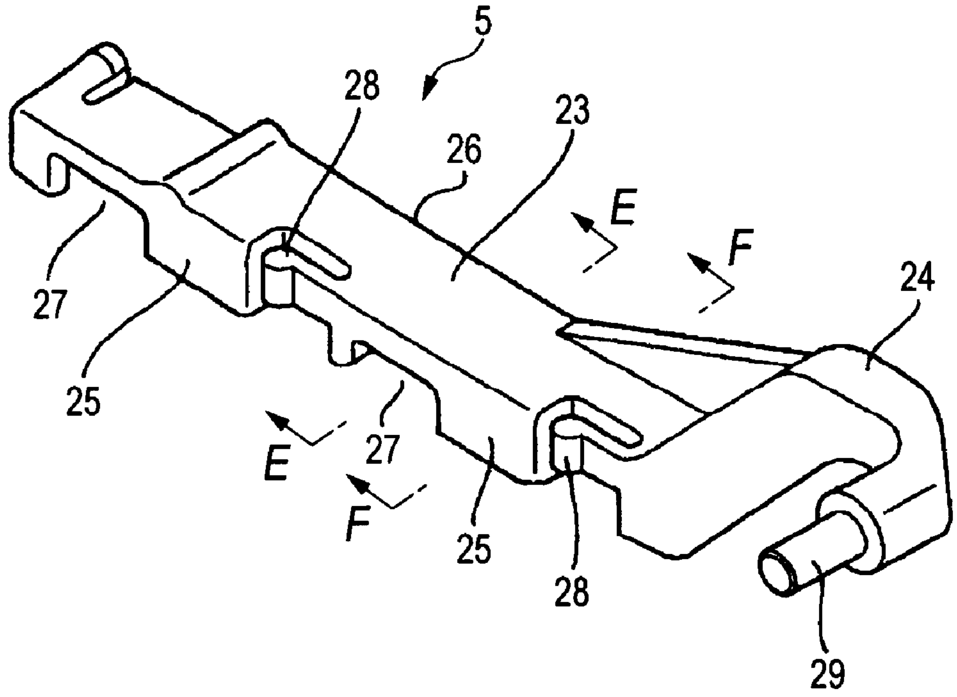
FIG. 5A is a perspective view showing a control lever from a rear side thereof.
Figure 5B:
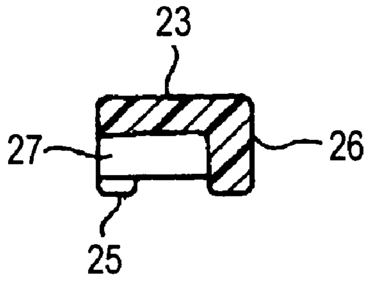
FIG. 5B is a sectional view taken along the line E-E in FIG. 5A.
Figure 5C:
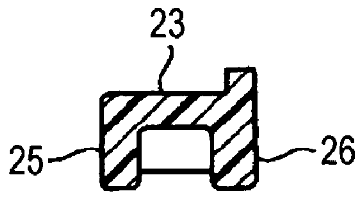
FIG. 5C is a sectional view taken along the line F-F in FIG. 5A.

As is also shown in FIGS. 5A to 5C, the control lever 5 is made up of a control portion 23 which is slidably accommodated within the recessed accommodation groove 12 of the housing 1 and a rising portion 24 which rises from the control portion 23, and the control portion 23 is constructed as follows. Namely, a first wall and the second wall 26 are provided in such a manner as to extend in parallel while defining an inner space therebetween, and a pair of recessed portions 27, which are opened to permit the pair of raised portions 19 formed on the hook member 3 to pass therethrough, respectively, are formed in the first wall 25 at a certain interval, while there is no recessed portion 27 in the second wall, 26 so that the second wall 26 constitutes a continuous wall. In addition, a plurality of elastic arms 28 are provided on the first wall 25 side, so that the control lever 5 is pushed by the plurality of elastic arms 28 within the accommodation groove 12 in the same direction as the direction in which the hook member 3 is biased by the compression coil spring 4. Consequently, although in case the biasing direction is opposite, the biasing force applied to the control lever 5 will be lost by virtue of the pushing operation of the hook member 3, leading to a risk that the control lever 5 gets loosened in an unprepared fashion within the accommodation groove 12, the occurrence of such an incident can be prevented.

Figure 9:
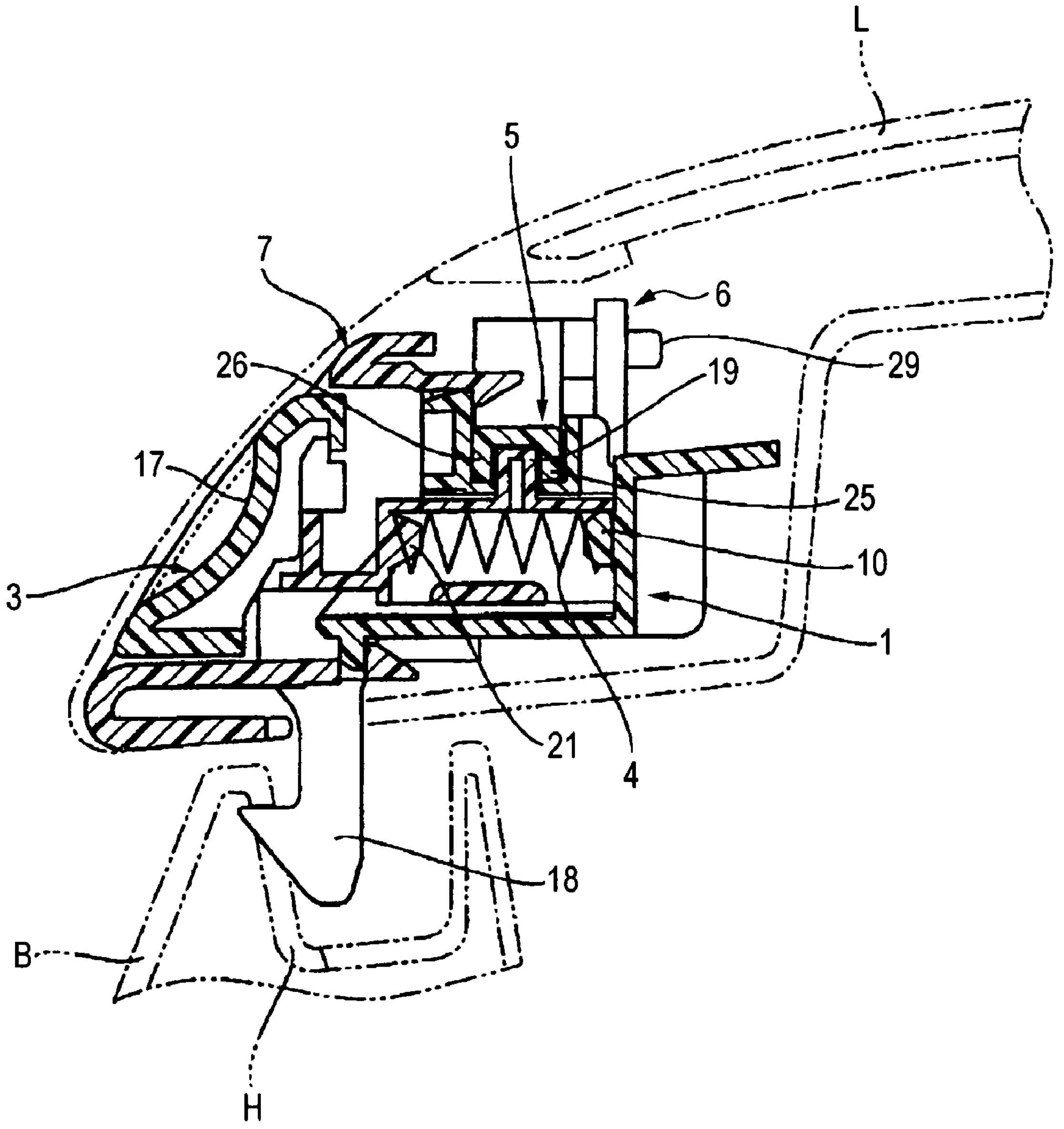
FIG. 9 is a sectional view showing a main part of the lock device in the locked state.

Namely, as is clearly seen from FIG. 9, in such a state that the hook member 3 is not being operated, the control lever 5 is pushed leftwards as viewed in the figure due to an abutment between the raised portions 19 and the second wall 26 that is obtained by virtue of a spring pressure exerted by the compression coil spring 4, while in such a state that the hook member 13 is being operated, since the biasing force by the compression coil spring 4 is lost, although the control lever 5 tends to be unstable by nature, the control lever 5 is still kept pushed by the elastic arms 28 in the same direction (leftwards as viewed in FIG. 11) as the biasing direction of the hook member 3, whereby in either of the cases, the unprepared looseness of the control lever 5 can be prevented effectively.

In addition, the rising portion 24 is constructed as follows. Namely, a connecting pin 29, adapted to be inserted into a connecting hole 32 in the cap 6, which will be described later on, in an engaging fashion, is provided on a side surface of the first wall 25 in such a manner as to protrude therefrom, so as to cause the control lever 5 to slide within the accommodation groove 12 of the housing 1 in two back and forth directions in response to rotations of the cap 6 in two back and forth directions as a result of corresponding operations of a key in the key cylinder 2.

As is shown in FIG. 1, the cap 6 is molded into substantially a teardrop-like shape as a whole. A connecting hole 30 into which a drive shaft 33 of the key cylinder 2, which will be described later on, is inserted for connection is formed in a central portion of a large diameter portion of the cap 6, and a plurality of locking pieces 31 are provided on a circumferential edge portion of the cap 6 in such a manner as to protrude therefrom so as to rotatably lock on to the holding cylinder 8 of the housing from the outside thereof, a connecting hole 32 being formed in a central portion of a small diameter portion of the cap 6 so that the connecting pin 29 on the control lever 5 is inserted thereinto in the engaging fashion.

Thus, in assembling the lock device that is configured as has been described heretofore, when the base element 16 of the hook member 3 is accommodated within the support box 9 of the housing 1 while mounting the compression coil spring 4 5 between the projection 10 on the housing 1 side and the projection 21 on the hook member 3 side with the push button portion 17 of the hook member 3 made to face the opening 7*b* in the decorative frame 7 from the inside thereof and the raised portions 19 on the hook member 3 are positioned in the vicinity of a widthways center of the accommodation groove 12 within the open areas 13 formed in the bottom surface of the accommodation groove 12, while the other end portion of the control lever 5 is slidably inserted into the support compartment 15 of the housing 1 in an engaging fashion with the inner space defined between the first wall 25 and the second wall 26 of the control lever 5 arranged to be placed over the plurality of raised portions 19, since the control portion 23 of the control lever 5 can easily be accommodated within the accommodation groove 12 which is widely opened above the housing 1, only in case the decorative frame 7 is securely attached to the housing 1 side thereafter, the raised portions 19 on the hook member 3 side then enter the inner space defined between the first wall 25 and the second wall 26 on the control lever 5 to thereby confront both the side walls 25, 26. Owing to this, the raised portions 19 on the hook member 3 are brought into abutment with the second wall 26 of the control lever 5 which constitutes the wall with no opening by virtue of the spring pressure of the compression coil spring 4, whereby the dislodgement of the hook member 3 from the housing 1 is prevented in an ensured fashion.

Consequently, since the farthest indexed position of the hook portion 18 of the hook member 3 which results when the hook member 3 is biased by virtue of the spring pressure of the compression coil spring 4 is defined only by bringing the raised portions 19 provided between the hook member 3 and the control lever 5 into abutment with the second wall 26, there occurs no case where the indexing control portion protrudes largely outwards from the housing 1 side as occurring in the conventional example, whereby there is caused no fear that the lock device itself is increased in size, and the surface configuration of the housing 1 becomes complex in no case. In addition, due to the reason that the control lever 5 is supported by the cap 6 locked on to the key cylinder 2 side at the one end portion and is supported by the support compartment 15 in the housing 1 only at the other end portion thereof, since the control lever 5 can be released from the housing 1 at the other portions than the other end portion thereof, the assembly of the control lever 5 on to the housing 1 can be facilitated.

Figure 6:
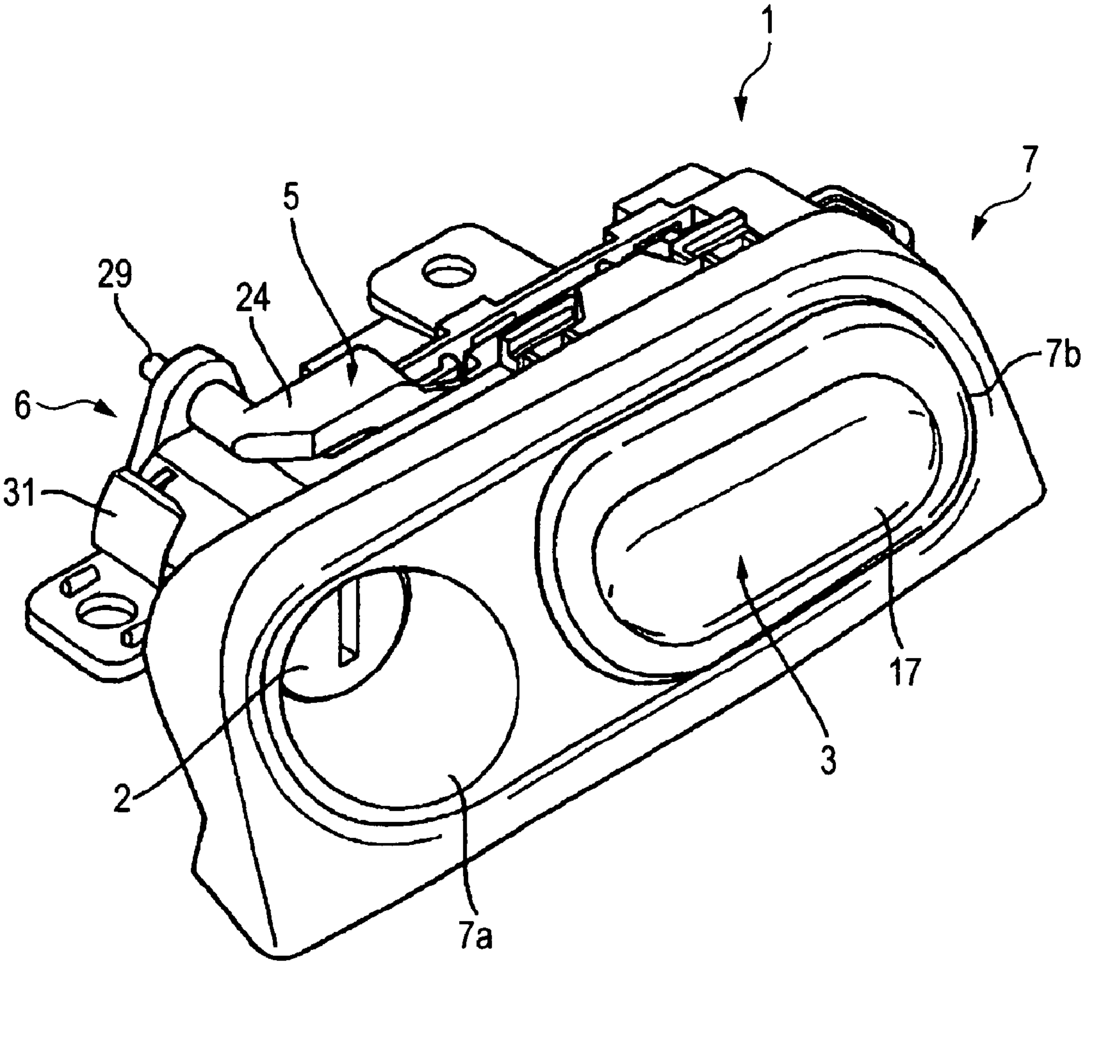
FIG. 6 is a perspective view showing an assembled state of the lock device from a front side thereof.
Figure 7:
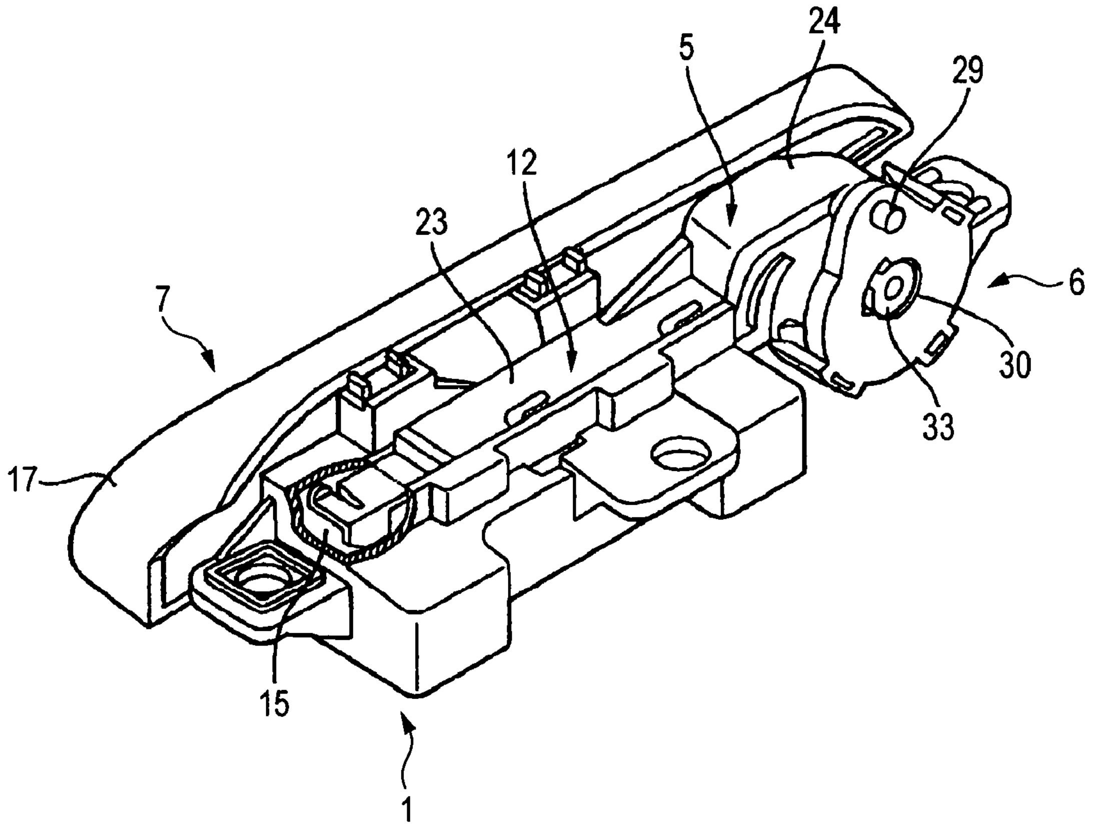
FIG. 7 is a perspective view showing the assembled state of the lock device from a rear side thereof.

Then, lastly, when the cap 6 is locked on to the holding cylinder 8 of the housing 1 which holds therein the key cylinder 2 in such a state that the connecting pin 29 of the control lever 5 is inserted into the connecting hole 32 in the cap 6 in the engaging fashion, the drive shaft 33 of the key cylinder 2 is connected into the connecting hole 30 in the cap 6 as is shown in FIGS. 6, 7, whereby locking and unlocking of the lid by the key cylinder 2 can be ensured. Consequently, thereafter, when the housing 1 is fixed to the side of the lid L of the console box B via an attachment piece, the lid lock device can be completed for use.

Figure 8:
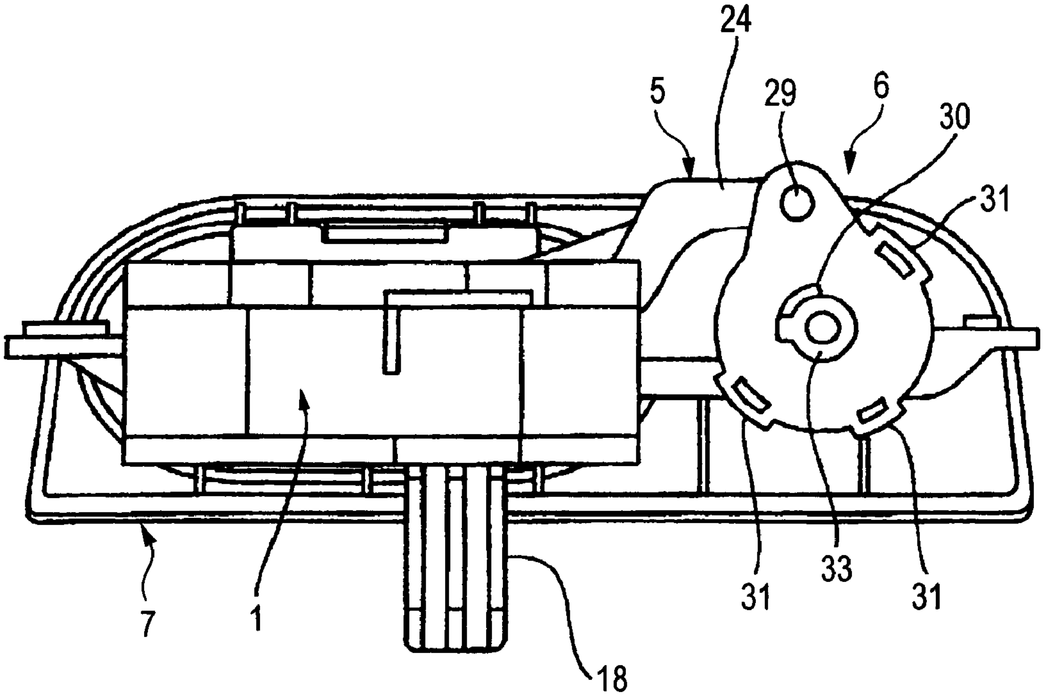
FIG. 8 is a rear view showing the lock device in a locked state.

Then, when in use, with the key cylinder 2 being now in a locked state, as is shown in FIG. 8, the cap 6 is rotates counterclockwise as viewed in the figure by the action of the drive shaft 33 of the key cylinder 2, so as to cause the control lever 5 to slide leftwards as viewed in the figure, whereby, as is shown in FIG. 9, the raised portions 19 on the hook member 3 are brought into abutment with the second wall 26 of the control lever 5 by virtue of the spring pressure of the compression coil spring 4 while being positioned so as not to coincide with the recessed portions 27 in the first wall 25, respectively, but to confront the other portions of the first wall 25 than the recessed portions 27. Therefore, even though the push button portion 17 of the hook member 3 is pushed in the operating direction many times, since the raised portions 19 of the hook member 3 are only brought into collision with the confronting wall surface of the first wall 25, the hook portion 18 of the hook member 3 is in engagement with the lock hole H opened in the opening edge of the console box B, whereby the lid L of the console box B is locked in the closure position thereof in an ensured fashion.

Figure 10:
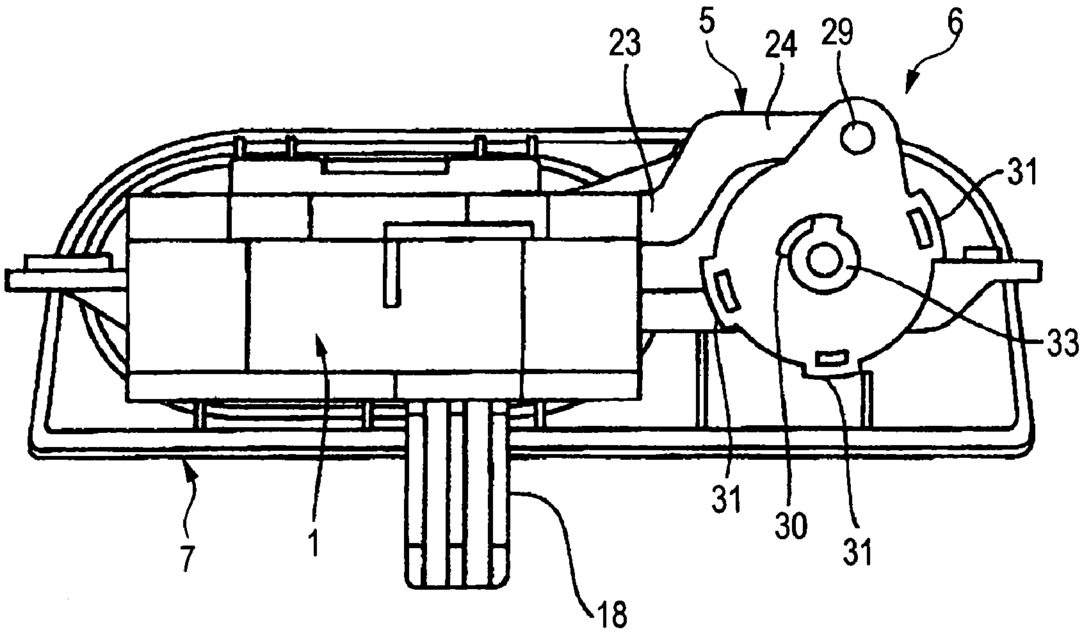
FIG. 10 is a rear view showing the lock device in an unlocked state.
Figure 11:
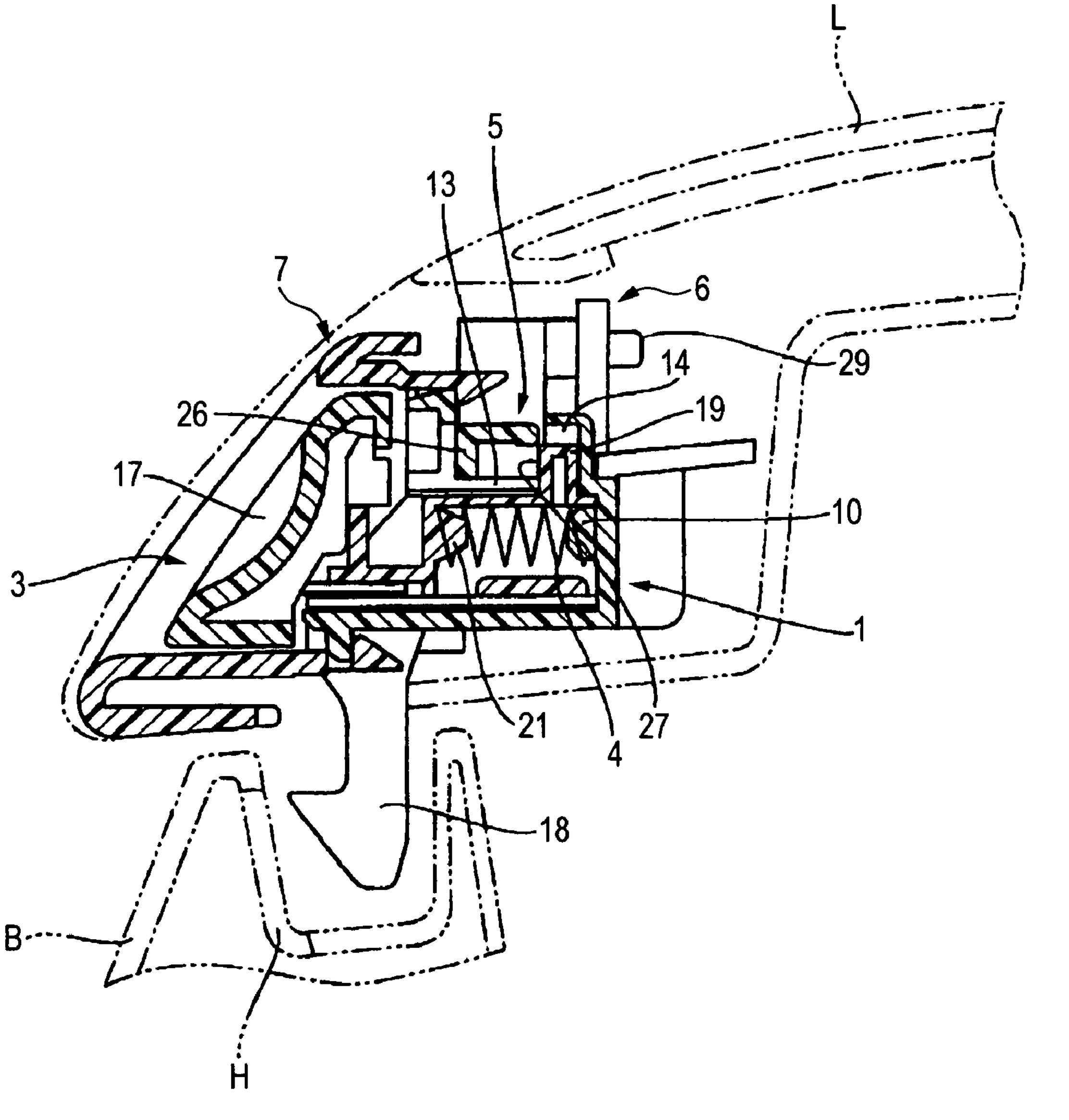
FIG. 11 is a sectional view showing the main part of the lock device in the unlocked state.

On the contrary, when opening the lid L of the console box B, since the cap 6 is rotated clockwise as shown in FIG. 10 so as to cause the control lever 5 to slide rightwards as viewed in the figure, the raised portions 19 on the hook member 3 are then allowed to coincide with the corresponding recessed portions 27 in the first wall 25, respectively, whereby when the push button portion 17 of the hook member 3 is pushed in the operating direction, the raised portions 19 on the hook member 3 are permitted to move as far as the receiving compartment 14 via the open areas 13 as is shown in FIG. 11, and the hook portion 18 of the hook member 3 is dislocated from the lock hole H, thereby making it possible to open the lid L.

Note that while in the embodiment, the raised portions 19 are formed on the hook member 3 side, and the first wall 25 having the recessed portions 27 formed therein and the second wall 26 are formed on the control lever 5 side, the invention is not limited thereto, and on the contrary, when carrying out the invention, the first wall 25 having the recessed portions 27 formed therein and the second wall 26 may be formed on the hook member 3 side, whereas the raised portions 19 may be formed on the control lever 5 side, as required. In addition, the push button portion 17 of the hook member 3 can be molded as a separate element from the base element 16 of the hook member 3.

With the lock device according to the invention, since the system itself can be made smaller in size, in the event that the lock device of the invention is applied to a lid such as one mounted in a console box of a motor vehicle in such a manner as to be opened and closed, a remarkably convenient result can be obtained.

What is claimed is:

1. A lid lock device for locking a lid which is mounted in a box and which is opened and closed, the lock device comprising:

- a housing fixed to the lid;
- a hook member including:
  - an operating portion formed to be pushed into an operation direction;
  - a base element extending from the operating portion to enter inside the housing and to slide along the operation direction with the operating portion;
  - a raised portion formed on the based element; and
  - a hook portion extending from the base element to be brought into engagement with and disengagement from a lock portion provided on the box;
- an elastic biasing unit biasing the base element of the hook member outward the housing so that the hook portion of the hook member is brought into engagement with the lock portion;
- a control member including a peripheral wall defining an inner space thereinside and being slidably supported on the housing to include the raised portion of the hook member inside the inner space; and
- a translating unit configured to translate the control member between:
  - a closing corresponding position where the hook member is inhibited to be pushed into the operating direction; and
  - an opening corresponding position where the hook member is allowed to be pushed into the operating direction,
- wherein the peripheral wall of the control member includes:
  - a first wall at a side far away from the operating portion, the first wall extending in a perpendicular direction to the operation direction to block the raised portion from passing therethrough;
  - a second wall at a side proximate the operating portion, the second wall extending in the perpendicular direction to block the raised portion from passing therethrough; and
  - a recessed portion formed on the first wall to allow the raised portion to pass therethrough in the operation direction,
- wherein when the control member is translated to the closing corresponding position by the translating unit, the recessed portion comes to a position where the raised portion is brought into abutment with other portions of the first wall than the recessed portion so as to prevent the operating portion from being operated, and
- wherein when the control member is translated to the opening corresponding position by the translating unit, the recessed portion comes to a position where the raised portion is made to enter the recessed portion so as to enable the operating portion to be operated against a biasing force of the elastic biasing unit.

2. The lid lock device according to claim 1, wherein one end portion of the control member is supported by the translating unit, and the other end portion thereof is supported by the housing.

3. The lid lock device according to claim 1, further comprising an elastic arm provided between the control member and the housing, the elastic arm pushing the control member in a same direction as a biasing direction of the hook member by the elastic biasing unit.

4. The lid lock device according to claim 1, wherein the first wall and the second wall are formed in one piece so that the raised portion is held therebetween in the operation direction when the control member is translated to the closing corresponding portion.

5. The lid lock device according to claim 1, wherein a size between the first wall and the second wall in the operation direction corresponds to a size of the raised portion in the operation direction.

6. The lid lock device according to claim 1, wherein the first wall and the second wall are formed in one piece.

7. The lid lock device according to claim 1, wherein the first wall and the second wall are configured to accommodate the raised portion between the first wall and the second wall.

8. The lid lock device according to claim 1, wherein a gap between the first wall and the second wall is substantially equivalent to a width of the raised portion.

9. A lid lock device for locking a lid which is mounted in a box and which is opened and closed, the lock device comprising:

- a housing fixed to one of the lid and the box;
- a hook member including:
  - an operating portion formed to be pushed into an operation direction;
  - a base element extending from the operating portion to enter inside the housing and to slide along the operation direction with the operating portion;

a first engagement portion formed on the based element; and a hook portion extending from the base element to be brought into engagement with and disengagement from a lock portion provided on the other of the lid and the box;

an elastic biasing unit biasing the base element of the hook member outward the housing so that the hook portion of the hook member is brought into engagement with the lock portion;

a control member including a second engagement portion formed to selectively engage and disengage with the first engagement portion; and a translating unit configured to translate the control member between:

a closing corresponding position where the hook member is inhibited to be pushed into the operating direction; and an opening corresponding position where the hook member is allowed to be pushed into the operating direction, wherein one of the first engagement portion and the second engagement portion includes a raised portion, wherein the other of the first engagement portion and the second engagement portion includes:

a first wall at a side far away from the operating portion, the first wall extending in a perpendicular direction to the operation direction to block the raised portion from passing therethrough;

a second wall at a side proximate the operating portion, the second wall extending in the perpendicular direction to block the raised portion from passing therethrough; and a recessed portion formed on one of the first wall and the second wall to allow the raised portion to pass therethrough in the operation direction, wherein when the control member is translated to the closing corresponding position by the translating unit, the recessed portion comes to a position where the raised portion is brought into abutment with other portions of the one of the first wall and the second wall than the recessed portion so as to prevent the operating portion from being operated, and wherein when the control member is translated to the opening corresponding position by the translating unit, the recessed portion comes to a position where the raised portion is made to enter the recessed portion so as to enable the operating portion to be operated against a biasing force of the elastic biasing unit.

10. A lid lock device for locking a lid which is mounted in a box and which is opened and closed, the lock device comprising:

a hook member configured to engage a lock portion provided on the box, the hook member including;

a base element; and a raised portion extending from the base element;

a control member including a peripheral wall configured to receive the raised portion of the hook member, the control member configured to move between a closing position where the hook member is inhibited to be pushed into an operating direction and an opening position where the hook member is allowed to be pushed into the operating direction, wherein the peripheral wall on the control member includes:

a first wall, extending in a direction perpendicular to the operation direction;

a second wall, separated from the first wall, extending in the perpendicular direction; and a recessed portion formed on one of the first wall and the second wall to allow the raised portion to pass therethrough in the operation direction, and wherein when the control member is translated to the closing position, the recessed portion comes to a position where the raised portion is brought into abutment with a portion of the first wall other than the recessed portion.

11. The lid lock device according to claim 10, wherein the first wall and the second wall are formed in one piece so that the raised portion is held therebetween in the operation direction when the control member is translated to the closing corresponding portion.

12. The lid lock device according to claim 10, wherein the first wall and the second wall are formed in one piece.

13. The lid lock device according to claim 10, wherein the first wall and the second wall are configured to accommodate the raised portion between the first wall and the second wall.

14. The lid lock device according to claim 10, wherein a gap between the first wall and the second wall is substantially equivalent to a width of the raised portion.

* * * * *